US008581719B2

(12) United States Patent  
Kuo et al.

(10) Patent No.: US 8,581,719 B2  
(45) Date of Patent: Nov. 12, 2013

(54) SUNROOF AND VEHICLE HAVING SAME

(75) Inventors: Yuan-Lung Kuo, Taipei Hsien (TW); Hou-Yao Lin, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 589 days.

(21) Appl. No.: 12/857,570

(22) Filed: Aug. 17, 2010

(65) Prior Publication Data

US 2011/0227751 A1 Sep. 22, 2011

(30) Foreign Application Priority Data

Mar. 19, 2010 (TW) .............................. 99108207 A (51) Int. Cl.
*B60Q 1/52* (2006.01)
*B60Q 7/02* (2006.01)
*B60J 7/00* (2006.01)
*B60J 7/043* (2006.01)
*B60J 10/12* (2006.01)
*G08B 21/00* (2006.01)

(52) U.S. Cl.
USPC ........... 340/472; 340/471; 340/689; 296/219; 296/216.01; 296/216.02

(58) Field of Classification Search
USPC ................................................. 340/472, 689
See application file for complete search history.

(56) References Cited

U.S. PATENT DOCUMENTS

| 4,259,660 | A | * | 3/1981 | Oliver | 340/480 |
| 4,630,029 | A | * | 12/1986 | Hayward | 362/542 |
| 4,662,095 | A | * | 5/1987 | Higgins | 40/592 |
| 4,754,376 | A | * | 6/1988 | Winslow | 362/92 |
| 4,860,178 | A | * | 8/1989 | Picon | 362/101 |
| 5,032,957 | A | * | 7/1991 | Canfield | 362/133 |
| 5,847,343 | A | * | 12/1998 | Kim | 200/61.76 |
| 6,100,800 | A | * | 8/2000 | Sigari | 340/473 |
| 6,337,623 | B1 | * | 1/2002 | Krugh et al. | 340/472 |
| 7,154,387 | B2 | * | 12/2006 | Boomershine, III | 340/467 |
| D556,617 | S | * | 12/2007 | Darolfi et al. | D10/114.1 |
| 7,313,870 | B2 | * | 1/2008 | Jeon | 33/288 |
| 7,551,049 | B2 | * | 6/2009 | Hirabayashi et al. | 335/106 |
| 7,825,790 | B2 | * | 11/2010 | Tallinger | 340/472 |
| 8,072,345 | B2 | * | 12/2011 | Gallo | 340/815.45 |

FOREIGN PATENT DOCUMENTS

KR   10-2006-0070741   *   6/2006

* cited by examiner

*Primary Examiner* — Benjamin C Lee
*Assistant Examiner* — Adam Carlson
(74) *Attorney, Agent, or Firm* — Altis & Wispro Law Group, Inc.

(57) ABSTRACT

An exemplary sunroof for mounting in a vehicle roof is provided. The sunroof includes a panel and a warning apparatus. The sunroof includes a first bottom surface for facing toward an inside of the vehicle. The warning apparatus includes a PCB attached to the panel, and a warning unit mounted on the first bottom surface and electrically connected to the PCB. The warning unit is configured to send an emergency alert signal when the panel is raised up to be substantially perpendicular to the vehicle roof. A vehicle includes the sunroof is also provided.

9 Claims, 8 Drawing Sheets

SUNROOF AND VEHICLE HAVING SAME

BACKGROUND

1. Technical Field

This disclosure relates, in general, to sunroofs, and more particularly, to a multi-purpose solar powered sunroof, and a vehicle including the sunroof.

2. Description of Related Art

When a car breaks down on the road it becomes a hazard, and so it is necessary to alert traffic the hazard with flares and or a reflective sign. However, it takes time for the driver to set up these warnings and the driver is in danger during this time.

What is needed, therefore, is a warning system that can be immediately deployed from within the vehicle, which can overcome the above shortcomings.

BRIEF DESCRIPTION OF THE DRAWINGS

Many aspects of the present sunroof and the vehicle can be better understood with reference to the following drawings. The components in the drawings are not necessarily drawn to scale, the emphasis instead being placed upon clearly illustrating the principles of the present sunroof and the vehicle. Moreover, in the drawings, like reference numerals designate corresponding parts throughout the views.

DETAILED DESCRIPTION

Figure 1:
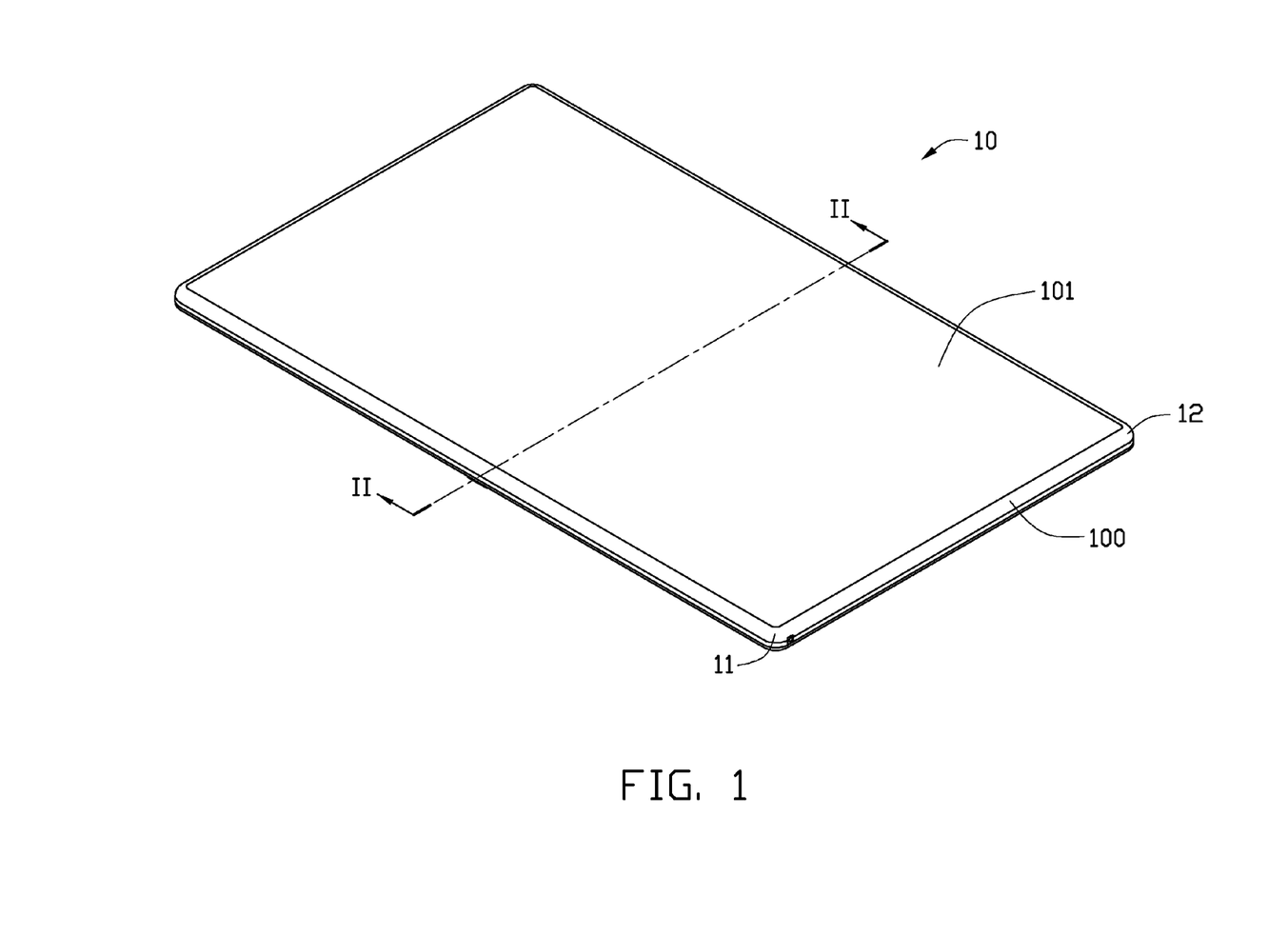
FIG. 1 is a perspective view of a sunroof in accordance with the first exemplary embodiment.
Figure 3:
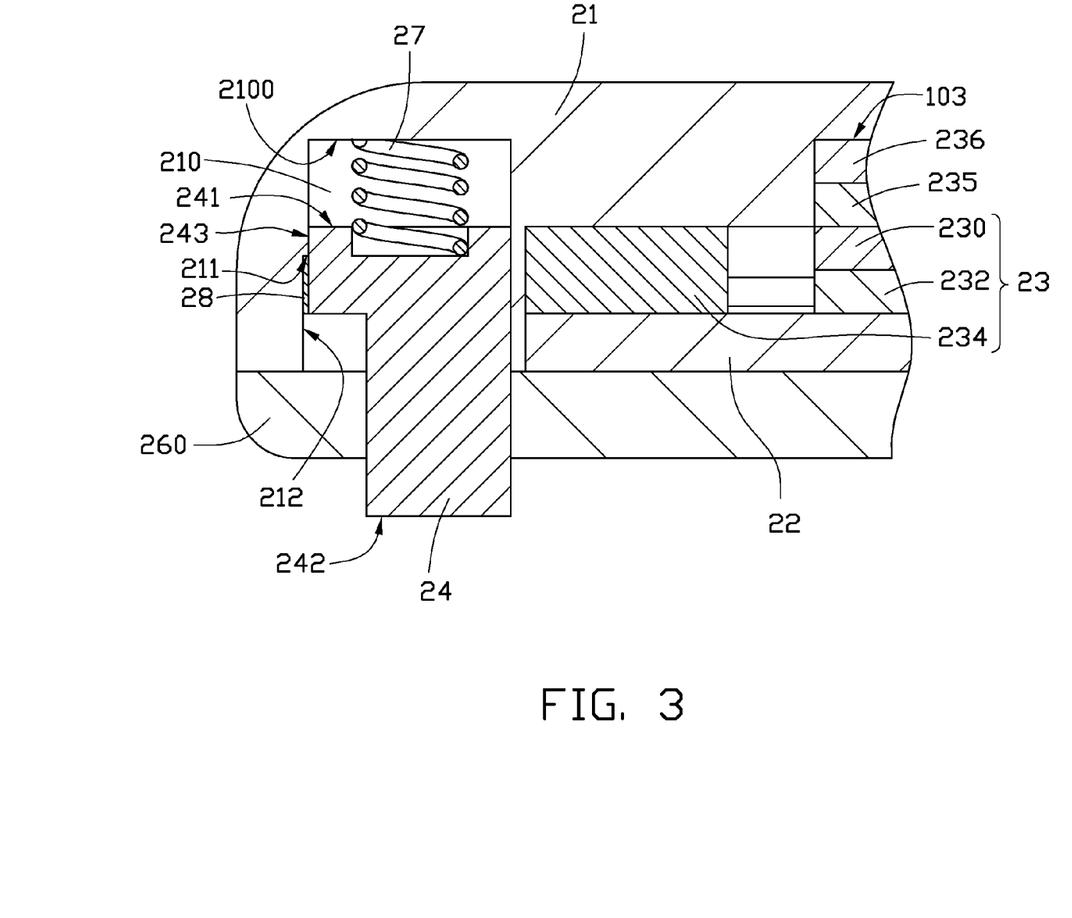
FIG. 3 is a partial, enlarged view of the sunroof shown in FIG. 2.
Figure 7:
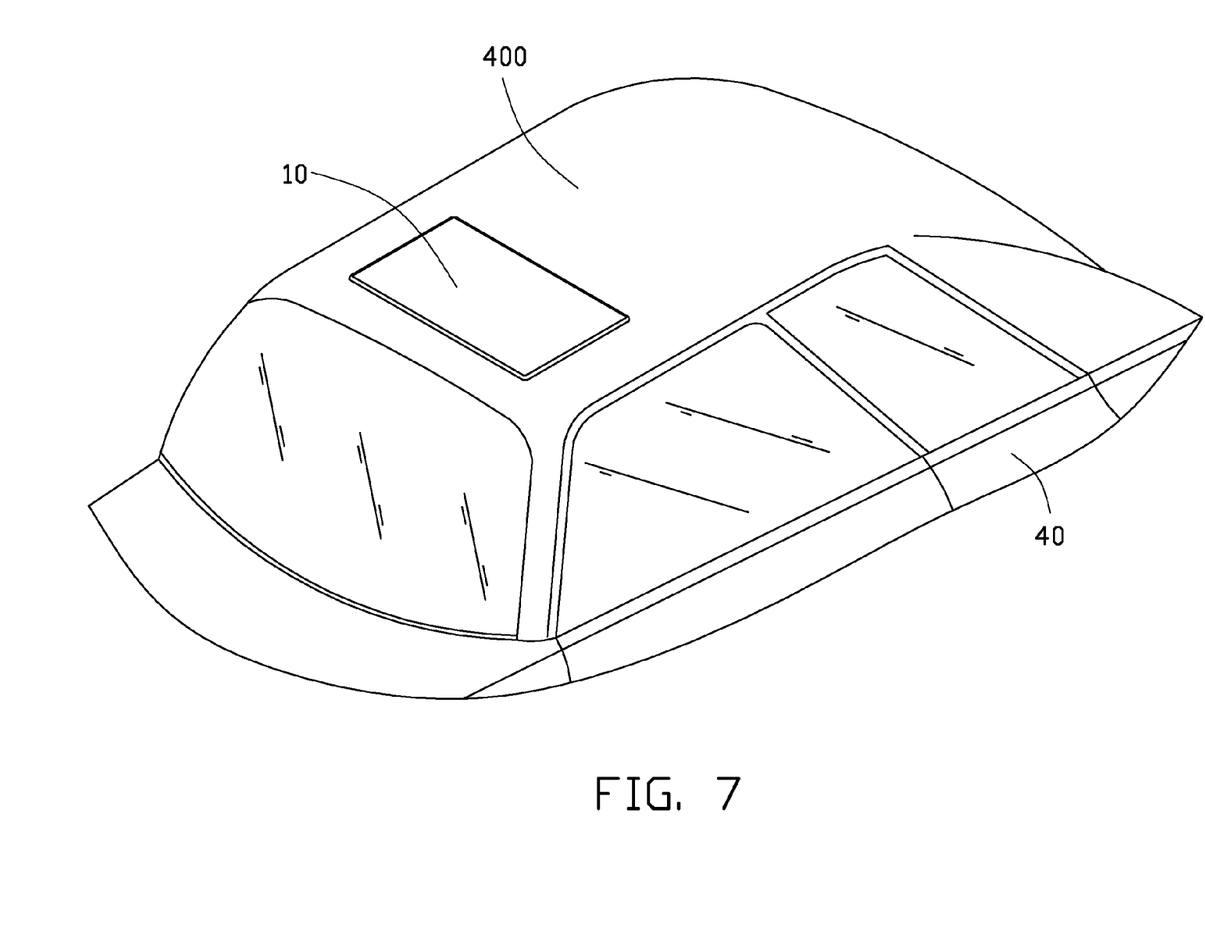
FIG. 7 is a partial, perspective view of a vehicle having the sunroof of FIG. 1.

Referring to FIGS. 1 and 3, a sunroof 10 includes a panel 100, a warning apparatus 26, and a switch 24. A vehicle 40 (see FIG. 7) includes a compartment. The compartment has a vehicle roof 400 defining an opening. The sunroof 10 is mounted in the vehicle roof 400 at the opening.

The panel 100 includes a cover 21 and a base 22. A front end 11 of the panel 100 is oriented toward the front of the vehicle 40, and a rear end 12 is oriented toward the rear of the vehicle 40. The cover 21 has a top surface 101 and an inner surface 103. The base 22 has a bottom surface 102. The cover 21 has a first recess 210 defined in the front end 11, and a separate second recess 220 defined between the inner surface 103 and the base 22.

The warning apparatus 26 includes a printed circuit board (PCB) 260 and a warning unit 262. The warning unit 262 is electrically connected to the PCB 260. The PCB 260 is attached to the panel 100. In this embodiment, the PCB 260 is underneath the base 22 and seals or covers the first recess 210. The PCB 260 has a bottom surface 261 faces the inside of the vehicle 40. The warning unit 262 is mounted on the bottom surface 102, particularly, underneath the bottom surface 261. The warning unit 262 is configured to send an emergency alert signal when the panel is raised up to be substantially perpendicular to the vehicle roof.

In other embodiments, the PCB 260 is available in many shapes and sizes, and the PCB 260 may instead be located underneath and cover the first recess 210.

The warning unit 262 may be any one or more of a liquid crystal display, a light emitting diode module, and a reflective sign board. Here, the warning unit 262 is a triangular light emitting diode module including a number of light emitting diodes. The warning sign can be easily seen by at least anyone approaching the vehicle 40 from behind when the panel 100 is raised up to an angle of, for instance, 90 degrees (see FIG. 4).

Figure 4:
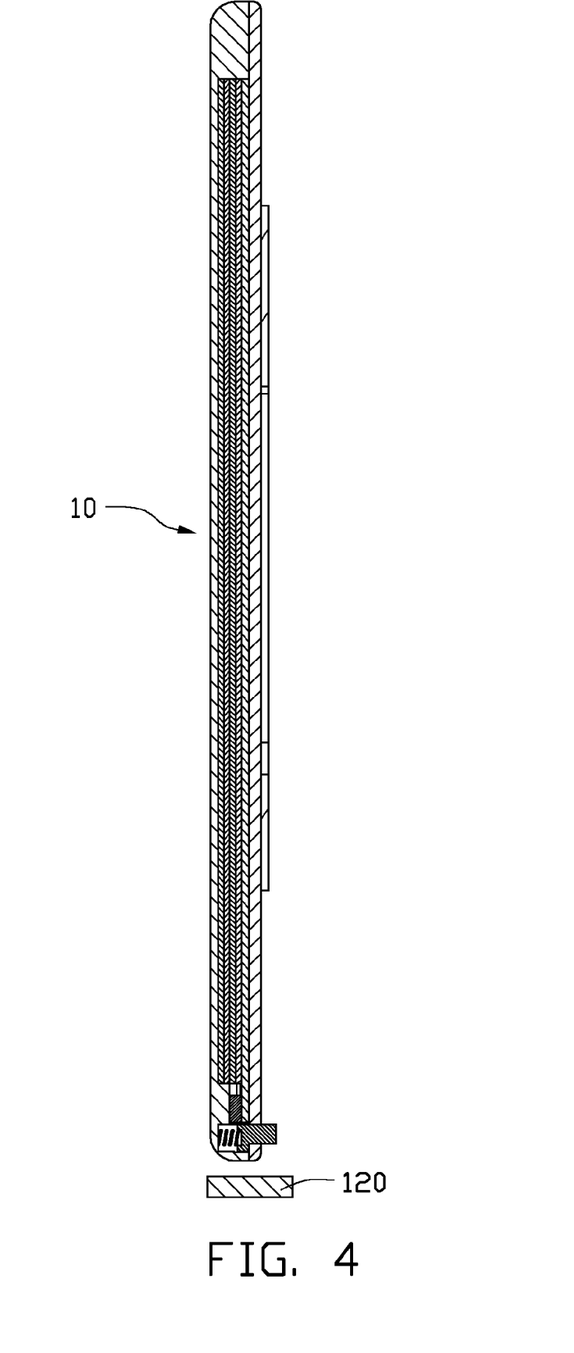
FIG. 4 is similar to FIG. 2, but showing the sunroof in raised to a position substantially perpendicular to a stopper of a vehicle roof.
Figure 5:
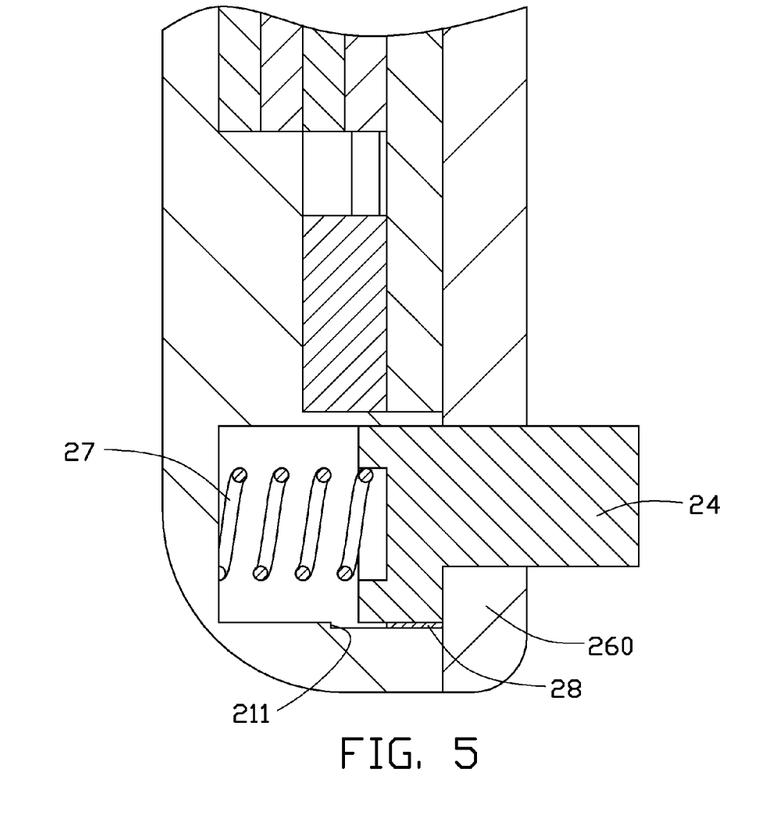
FIG. 5 is a partial, enlarged view of the raised up sunroof of FIG. 4.

Referring to FIGS. 3, 4 and 5, the switch 24 electrically connected to a power source is configured to switch on or switch off the warning unit 262. The switch 24 has a first end surface 241, an opposing second end surface 242 substantially parallel to the first end surface 241, and a third end surface 243 substantially perpendicularly connected to the first end surface 241. A conductive member 28 is positioned between the first end surface 241 and the second end surface 242, and attached to the third end surface 243.

The first recess 210 has an opening and a bottom surface 2100. The switch 24 is inserted into the first recess 210 extending through the PCB 260 and the opening, leaving the second end surface 242 contacting with a stopper 120 underneath the first recess 210 configured for triggering the switch 24. The first end surface 241 faces the bottom surface 2100.

Figure 2:
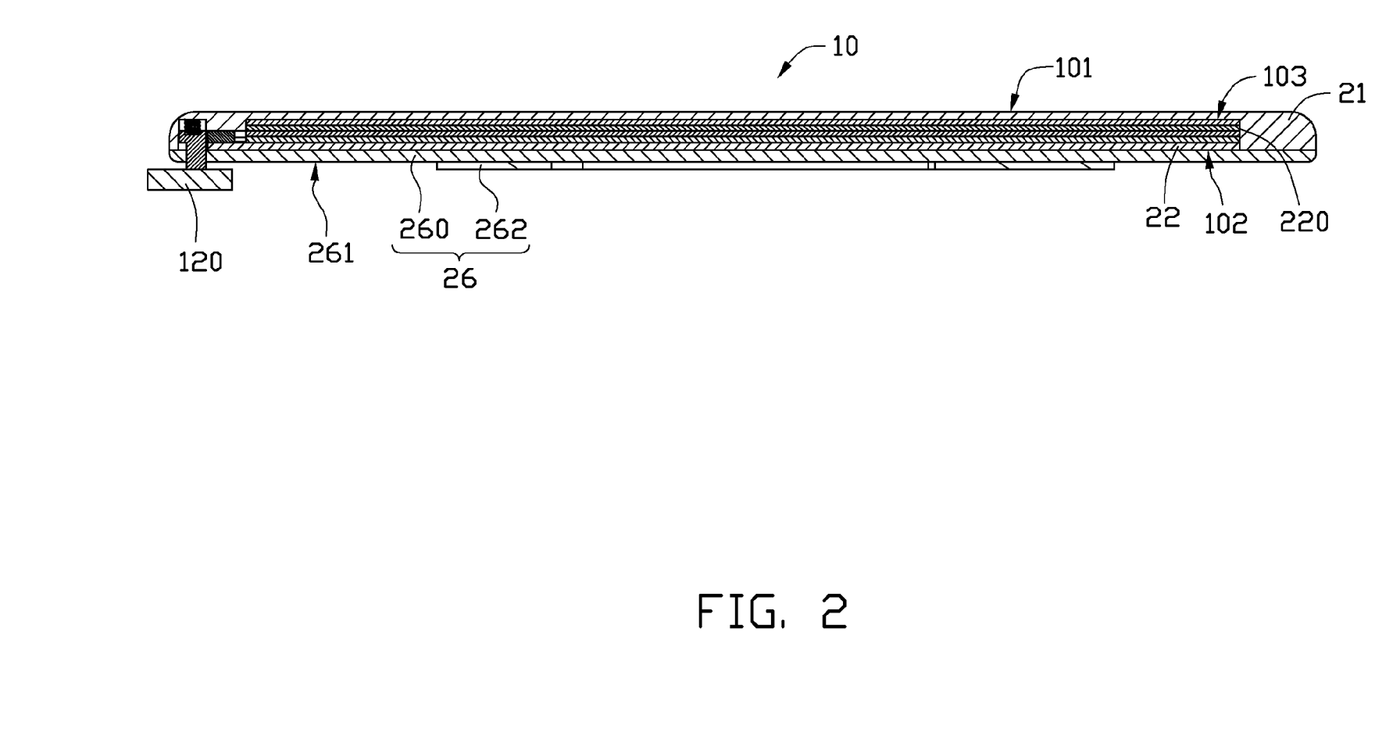
FIG. 2 is a cross-sectional view of the sunroof of FIG. 1 generally taken along line II-II.
Figure 6:
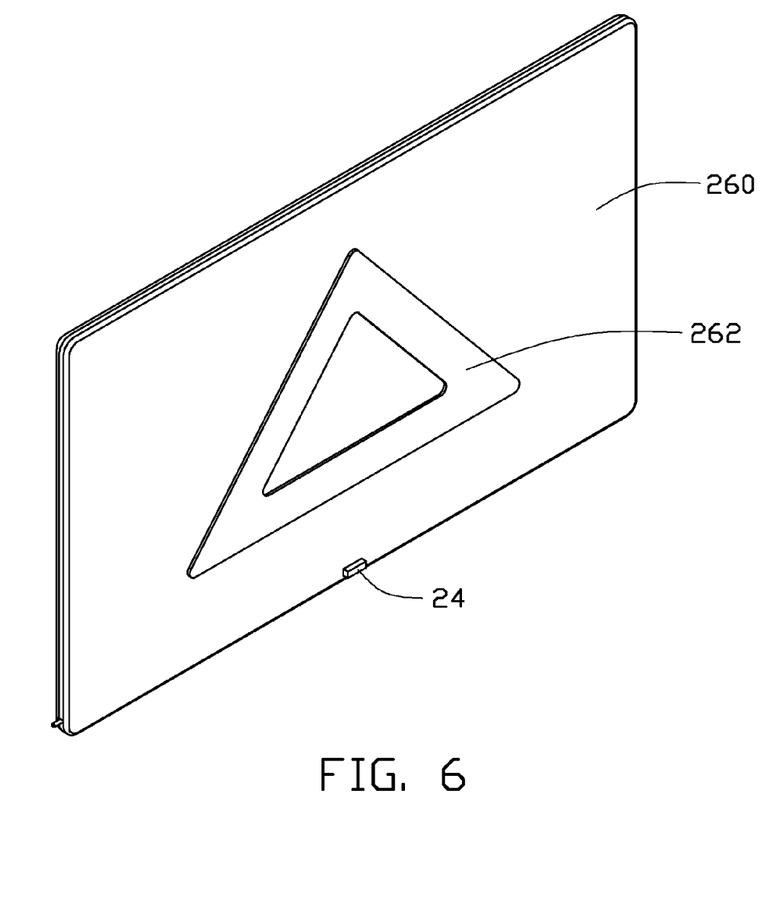
FIG. 6 is a perspective view of the raised up sunroof.

The switch 24 is spring loaded for automatic activation by placing a resilient member 27 applying a force to the switch 24 in a direction from the first end surface 241 to the second end surface 242. The first end surface 241 is initially in contact with the stopper 120 when the panel 100 seals the opening of the vehicle roof 400, and the conductive member 28 is disconnected from the PCB 260 (see FIGS. 2 and 3), and the warning unit 262 is switched off. When the panel 100 is raised up to be substantially perpendicular to the vehicle roof 400, the first end surface 241 leaves the stopper 120, the resilient member 27 rebounds activating the switch 24 so that the conductive member 28 is connected with the PCB 260, and thus, the warning unit 262 is switched on (see FIGS. 4, 5, and 6). A variety of types of lifter mechanisms proposed could be used here to lift the sunroof 10 up to a desired angle relative to the vehicle roof 400.

It is noteworthy that the stopper 120 is a part of the sunroof 10, or a part of the vehicle roof 400. Besides the third end surface 243, the conductive member 28 may be attached to the other position of the switch 24 as long as the conductive member 28 is capable of contacting with the PCB 260.

Furthermore, the panel 100 includes an inner side wall 212 in the first recess 210. The inner side wall 212 is substantially perpendicular to the bottom surface 2100. A step surface 211 defined in the inner side wall 212 is configured to block the movement of the conductive member 28 as well as the switch 24 toward the second bottom surface 2100.

The vehicle 40 includes a power source 23. Referring to the FIG. 3, the power source 23 is located in the second recess 220. The power source 23 includes a sheet shaped solar cell panel 230, a sheet shaped battery 232, and a controller 234. The sheet shape of the solar cell panel 230 and the battery 232 allows convenient placement of the components inside the panel 100. The power source 23, in another embodiment, is located outside the second recess 220 but in the sunroof 10, or inside the vehicle roof 400. Here, the cover 21 is transparent. The solar cell panel 230 faces away form the inside of the compartment. The warning unit 262 is electrically coupled to the solar cell panel 230.

The solar cell panel 230 includes monocrystalline silicon solar cells, polycrystalline silicon solar cells, or a variety of types of thin film solar cells. The solar cell panel 230 converts the solar energy into electricity. The battery 232 stores the electricity. The controller 234, electrically connected with the battery 232, controls the type of the current, direct current or alternating current, provided to the electronic devices of the vehicle 40, for example, the warning unit 262, the interior ventilation fan, or the headlight.

If desired, added protection for the solar cell panel 230 may be provided by the addition of a transparent plastic layer 235 and a transparent protecting film 236 on the solar cell panel 230.

Figure 8:
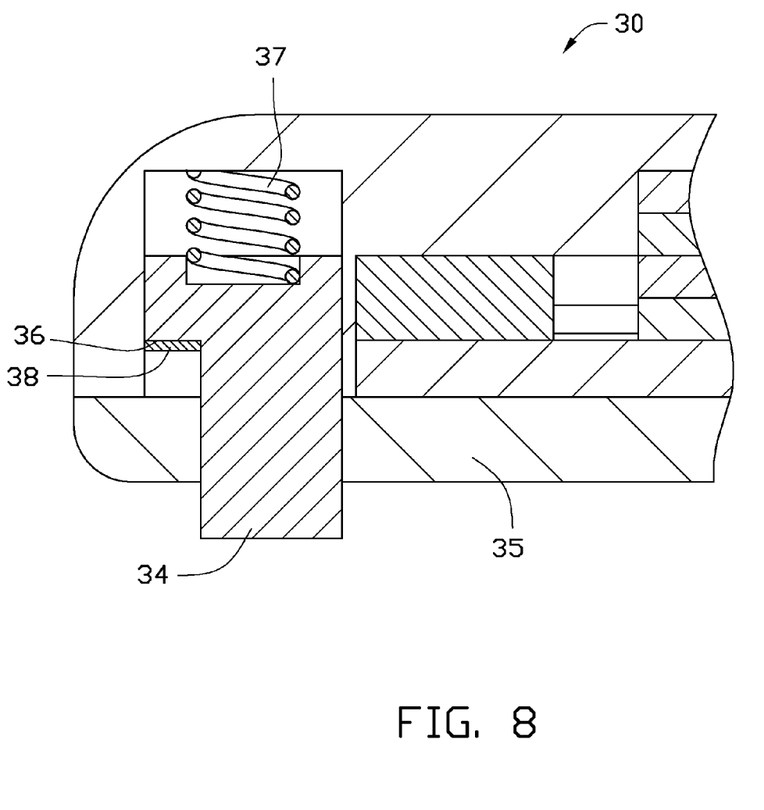
FIG. 8 is a partial, sectional view of a sunroof in accordance with a second exemplary embodiment.

Referring to FIG. 8, the sunroof 30 of a second embodiment is almost the same as the sunroof 10. A difference is, the switch 34 has a middle surface 36 substantially parallel and located between the two end surfaces of the switch 34, and a conductive member 38 is attached to the middle surface 36. When the switch 34 is activated by the resilient member 37, the conductive member 38 will contact a PCB 35, and the warning unit is turned on.

Sunroofs adopting the present warning apparatus provide a safe and efficient method for deployment of hazard warning devices. Furthermore, the sunroofs are environmentally friendly by using solar energy to provide the vehicle with electricity.

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A sunroof for mounting in a vehicle roof of a vehicle, comprising:
    a panel comprising:
    a cover, the cover being transparent and comprising a top surface and an inner surface opposite to the top surface; and
    a base comprising a first bottom surface for facing toward an inside of the vehicle;
    a front end oriented toward the front of the vehicle, a first recess defined in the front end, a PCB covering the first recess, the first recess including a second bottom surface facing toward the inside of the vehicle;
    a power source comprising a solar cell panel received between the inner surface and the base, and configured for converting the solar energy into electricity; and
    a warning apparatus connected to the power source, the warning apparatus comprising:
    the PCB attached to the panel, and
    a warning unit mounted on the first bottom surface and electrically connected to the PCB, the warning unit configured to send an emergency alert signal along a direction facing away the first bottom surface when the panel is raised up to be substantially perpendicular to the vehicle roof;
    a switch electrically connected with the warning apparatus, the switch comprising a conductive member; the switch inserted into the first recess and extending through the PCB and being movable relative to the second bottom surface between a first position where the conductive member is connected with the PCB and the warning unit is switched on, and a second position where the conductive member is disconnected from the PCB and the warning unit is switched off.

2. The sunroof according to claim 1, wherein the switch further comprises:
    a body having a first end surface facing the second bottom surface and an opposing second end surface substantially parallel to the first end surface; and
    a resilient member between the second bottom surface and the second end surface configured to apply a force to the body in a direction from the first end surface to the second end surface.

3. The sunroof according to claim 2, wherein the switch further comprises a third end surface substantially perpendicularly connected between the first and second end surfaces, and the conductive member attached to the third end surface.

4. The sunroof according to claim 2, wherein the switch further comprises a middle surface substantially parallel to and located between the first and second end surfaces, and the conductive member attached to the middle surface.

5. The sunroof according to claim 2, further comprising a stopper for triggering the switch.

6. The sunroof according to claim 1, wherein the panel comprises an inner side wall in the first recess, the inner side wall substantially perpendicular to the second bottom surface, and having a step surface configured to block movement of the conductive member toward the second bottom surface.

7. The sunroof according to claim 1, wherein the panel further comprises:
    a second recess defined in the panel; and
    the power source located in the second recess.

8. The sunroof according to claim 1, wherein the solar cell panel includes a battery configured for storing the electricity.

9. The sunroof according to claim 1, wherein the warning unit is a liquid crystal display, a light emitting diode module, or a reflective sign board.

* * * * *